(12) United States Patent
Douglas et al.

(10) Patent No.: US 7,969,967 B2
(45) Date of Patent: Jun. 28, 2011

(54) NUMBER PORTABILITY FOR AN IMS NETWORK

(75) Inventors: John Douglas, Aurora, IL (US); Subhashish Ghosh, Naperville, IL (US); Vickie Lynn Kolka, Plano, IL (US); Martin Henry Van Leeuwen, Oswego, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1426 days.

(21) Appl. No.: 11/418,615

(22) Filed: May 5, 2006

(65) Prior Publication Data

US 2007/0258575 A1 Nov. 8, 2007

(51) Int. Cl.
*H04L 12/66* (2006.01)
*H04M 1/64* (2006.01)
*H04M 7/00* (2006.01)
*H04W 40/00* (2009.01)
*G06F 15/16* (2006.01)

(52) U.S. Cl. ............ 370/352; 370/392; 370/395.2; 370/401; 379/88.17; 379/220.01; 379/221.13; 455/445; 709/227; 709/249

(58) Field of Classification Search .......... 370/352, 370/392, 395.2, 401; 379/88.17, 220.01, 379/221.13; 455/445; 709/227, 249
See application file for complete search history.

(56) References Cited

U.S. PATENT DOCUMENTS

| | | | | |
|---|---|---|---|---|
| 6,871,070 B2 * | 3/2005 | Ejzak | ............... | 455/435.1 |
| 6,873,849 B2 * | 3/2005 | de la Red et al. | ............ | 455/445 |
| 6,917,612 B2 * | 7/2005 | Foti et al. | ............... | 370/352 |
| 6,954,654 B2 * | 10/2005 | Ejzak | ............... | 455/560 |
| 6,996,087 B2 * | 2/2006 | Ejzak | ............... | 370/338 |
| 7,003,280 B2 * | 2/2006 | Pelaez et al. | ............... | 455/406 |
| 7,028,101 B2 * | 4/2006 | Costa-Requena et al. | .... | 709/245 |
| 7,043,232 B2 * | 5/2006 | Pelaez et al. | ............... | 455/412.1 |
| 7,260,207 B2 * | 8/2007 | Marsico | ............... | 379/220.01 |
| 7,274,683 B2 * | 9/2007 | Segal | ............... | 370/352 |
| 7,283,489 B2 * | 10/2007 | Palaez et al. | ............... | 370/277 |
| 7,392,034 B2 * | 6/2008 | Westman et al. | ............... | 455/402 |
| 7,403,517 B2 * | 7/2008 | Westman | ............... | 370/352 |
| 7,450,565 B2 * | 11/2008 | Suotula et al. | ............... | 370/352 |
| 7,502,837 B2 * | 3/2009 | Westman et al. | ............... | 709/219 |
| 7,512,090 B2 * | 3/2009 | Pelaez et al. | ............... | 370/328 |
| 7,586,857 B2 * | 9/2009 | Ejzak et al. | ............... | 370/260 |

(Continued)

FOREIGN PATENT DOCUMENTS

WO  WO 2004/071043  8/2004

OTHER PUBLICATIONS

Adiseshu Hari, et al.; Intelligent Media Gateway Selection in a VoIP Network; Bell Labs Technology Journal; Mar. 21, 2005; pp. 47-57; Wiley Periodicals, Inc., Murrey Hill, NJ USA.

*Primary Examiner* — Alpus H Hsu
(74) *Attorney, Agent, or Firm* — Carmen Patti Law Group, LLC

(57) ABSTRACT

An apparatus and method for number portability for an IMS network. In one example the method may have the steps of: processing all calls with E.164 numbers in a BGCF (Breakout Gateway Control Function); executing digit analysis on a respective E.164 number in the BGCF; and querying, by the BGCF, a NPDB (portable number database) to retrieve a routing number if the respective E.164 number is ported.

18 Claims, 9 Drawing Sheets

U.S. PATENT DOCUMENTS

| | | | |
|---|---|---|---|
| 7,630,485 B2 * | 12/2009 | Ku et al. | 379/221.13 |
| 7,787,443 B2 * | 8/2010 | Varney et al. | 370/352 |
| 7,796,578 B2 * | 9/2010 | Stafford | 370/351 |
| 7,889,716 B2 * | 2/2011 | Tejani et al. | 370/352 |
| 2003/0224722 A1 * | 12/2003 | Martin et al. | 455/11.1 |
| 2004/0190689 A1 * | 9/2004 | Pelaez et al. | 379/88.13 |
| 2004/0204095 A1 | 10/2004 | Cyr | |
| 2004/0246965 A1 * | 12/2004 | Westman et al. | 370/392 |
| 2005/0058125 A1 * | 3/2005 | Mutikainen et al. | 370/354 |
| 2005/0096029 A1 * | 5/2005 | Pelaez et al. | 455/419 |
| 2005/0286531 A1 * | 12/2005 | Tuohino et al. | 370/395.2 |
| 2006/0068816 A1 * | 3/2006 | Pelaez et al. | 455/466 |
| 2006/0079236 A1 * | 4/2006 | Del Pino et al. | 455/445 |
| 2006/0105766 A1 * | 5/2006 | Azada et al. | 455/432.1 |
| 2006/0155871 A1 * | 7/2006 | Ilkka et al. | 709/238 |
| 2006/0286980 A1 * | 12/2006 | Hua | 455/435.1 |
| 2007/0014281 A1 * | 1/2007 | Kant | 370/352 |
| 2007/0061397 A1 * | 3/2007 | Gregorat et al. | 709/203 |
| 2007/0071221 A1 * | 3/2007 | Allen et al. | 379/265.01 |
| 2007/0086582 A1 * | 4/2007 | Tai et al. | 379/114.01 |
| 2007/0213038 A1 * | 9/2007 | Masseroni et al. | 455/414.3 |

* cited by examiner

NUMBER PORTABILITY FOR AN IMS NETWORK

TECHNICAL FIELD

The invention relates generally to telecommunication systems and, more specifically, to a system that has an IMS entity that may support number portability and the routing for E.164 numbers.

BACKGROUND

Number portability has not been addressed consistently or completely in VoIP networks. However in the circuit switched networks, various methods have been used. Some of the circuit switched methods are as follows.

In an "all call query" the originating network switch queries a central database (NPDB) for a routing number. This is done for all calls that come into the switch. This routing number is then used to route the call to the destination.

In "onward routing" the call is routed to the destination switch which detects that the dialed number is ported. The destination switch queries a central database (NPDB) to obtain the new routing number and routes the call.

In "query on release" the call is routed with the original dialed digits. The destination network detects that the dialed number is ported and releases the call with a cause code indicating the porting. The originating switch then queries a central database (NPDB) to obtain the new routing number. It uses this number to reroute the call.

In "call drop back", like the "query on release" case, the call is routed to the destination network. The terminating switch discovers that the dialed number is ported and queries a central database NPDB to retrieve the new routing number. It then releases the call with the routing number in the response. The originating switch uses this routing number to reroute the call.

In all of the these solutions, the logic for querying the database and routing the call is embedded in the switch call processing software. The concept of distributed switching elements is not found in the circuit switched networks.

Thus, there is a need in the art for an improved and more efficient system that has an IMS entity that may support number portability and the routing for E.164 numbers.

SUMMARY

One embodiment of the present method and apparatus encompasses an apparatus. This embodiment may comprise: a BGCF (Breakout Gateway Control Function) in an IMS (IP Multimedia Subsystem) network; portability number query module in the BGCF; a portable range table operatively coupled to the portability number query module; a NPDB (Number Portability Database) operatively coupled to the portability number query module in the BGCF; and an ENUM DB (ENUM Database) operatively coupled to the portability number query module in the BGCF.

Another embodiment of the present method and apparatus encompasses a method. This embodiment may comprise: processing all calls with E.164 numbers in a BGCF (Breakout Gateway Control Function); executing digit analysis on a respective E.164 number in the BGCF; and querying, by the BGCF, a NPDB (portable number database) to retrieve a routing number if the respective E.164 number is ported.

DESCRIPTION OF THE DRAWINGS

Features of exemplary implementations of the invention will become apparent from the description, the claims, and the accompanying drawings in which:

DETAILED DESCRIPTION

Figure 1:
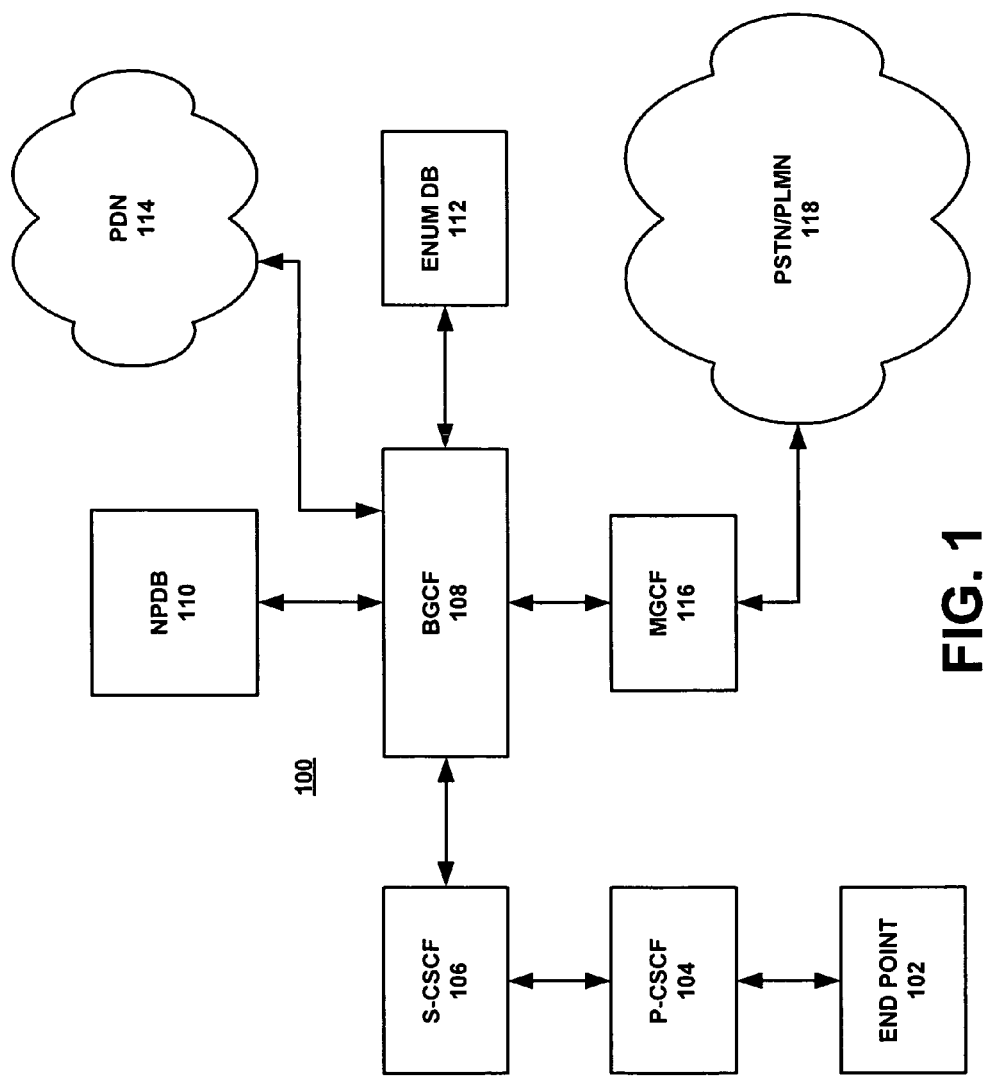
FIG. 1 depicts an embodiment that implements an IMS entity that may support number portability and the routing for all E.164 numbers.

The following terms are used in the present description:
3GPP (Third Generation Partnership Project)
AS (Application Servers)
BGCF (Breakout Gateway Control Function)
DNS (Domain Name System)
ENUM (TElephone NUmber Mapping)
ENUM DB (TElephone NUmber Mapping Database)
HSS (Home Subscriber Server)
I-CSCF (Interrogating Call Session Control Function)
IMS (IP Multimedia Subsystem)
IP (Internet Protocol)
ISUP (ISDN User Part)
MGCF (Media Gateway Control Function)
MGW (Media Gateway)
MRF (Multimedia Resource Function)
NPDB (Number Portability Database)
P-CSCF (Proxy Call Session Control Function)
PDN (Packet Data Network)
PLMN (Public Land Mobile Network)
PSTN (Public Switched Telephone Network)
S-CSCF (Serving Call Session Control Function)
SIP (Session Initiation Protocol)
URI (Uniform Resourced Identifier)
VoIP (Voice over IP)

In embodiments of the present apparatus and method a BGCF is designated as an IMS entity that may support number portability and the routing for all E.164 numbers. It is to be understood that the use herein of the term BGCF refers to the enhanced BGCF and not to the regular BGCF as defined by 3GPP. With the handling of E.164 numbers at one location in the IMS network, the BGCF will naturally facilitate efficient handling of ported numbers. Number portability is an issue pertaining only to E.164 numbers, and if the processing of ported numbers is isolated on one element, it will result in more efficient use of resources.

E.164 is the name of the international telephone numbering plan administered by the International Telecommunication Union (ITU), which specifies the format, structure, and administrative hierarchy of telephone numbers. "E.164" refers to the ITU document that describes the structure of telephone numbers. The ITU issues country codes to sovereign nations, but administration of telephone numbers within each country is governed by that country's telecommunications regulatory agency. A fully qualified E.164 number is designated by a country code, an area or city code, and a phone number. For example, a fully qualified E.164 number for the phone number 555-1234 in Washington, D.C. (area code 202) in the United States (country code 1) would be +1-202-555-1234.

E.164 numbers are appropriate for use in ENUM because they are an existing system for global traceability. Further, because country codes and assignments change only in the event of the collapse or complete restructuring of governments, these numbers tend to be static.

ENUM was developed as a solution to the question of how network elements can find services on the Internet using only a telephone number, and how telephones, which have an input mechanism limited to twelve keys on a keypad, can be used to access Internet services. ENUM at its most basic is the convergence of PSTN and IP networks; it is the mapping of a telephone number from the public switched telephone network to Internet functionalities.

Embodiments of the present apparatus and method may be utilized in an IMS network. The IP Multimedia Subsystem (IMS) provides signaling to control of real time multi media services for the packet domain in UMTS networks and allows for smooth integration of new IP based services (e.g. Voice over IP). The major signaling protocol used is IETF Session Initiation Protocol (SIP).

IMS Defines a Set of Components:

Call Session Control Function (CSCF), which acts as Proxy CSCF (P-CSCF) in Visited network, Serving CSCF (S-CSCF) in Home network or Interrogating CSCF (I-CSCF) in Home network, to route and control the session establishment;

Home Subscriber Server (HSS) with AAA functionality and unique service profile for each user;

Media Gateway Control Function (MGCF) with Signaling Gateway, which controls Media Gateway and performs protocol conversion between ISUP and SIP;

Media Gateway (MGW), which interacts with MGCF for resource control;

Multimedia Resource Function (MRF), which controls media stream resources;

Breakout Gateway Control Function (BGCF), which selects the network in which PSTN breakout is to occur; and Application Servers (AS), which offers value added services.

Embodiments of the present method and apparatus provide a solution for the problem of handling ported E.164 numbers in IMS. There are various ways of handling number portability pertaining to E.164 numbers in the traditional circuit switched networks. In the IMS networks where Voice Over IP (VOIP) is used, there has not been a proposal for consistently handling ported numbers. The problem of ported numbers is further complicated by the fact that for the foreseeable future, IMS networks have to co-exist with circuit switched networks. This solution is a consistent optimal way of handling number portability in the IMS network. Embodiments of the present method and apparatus utilize an existing IMS component, namely the Breakout Gateway Control Function (BGCF) to accomplish the task of handling ported numbers.

In the VOIP based IMS networks, various server elements called control functions are used for processing a call. The voice packets are sent from one End-Terminal to another End-Terminal for an all IMS call, and one End-Terminal to a Gateway for an IMS to PSTN/PLMN call. The signaling passes through various control functions. In the IMS most of the call processing logic lies in the Serving CSCF (S-CSCF). In keeping with traditional implementations for number portability, the logic for number portability should be in the S-CSCF server. However, according to the present apparatus and method number portability is handled using the BGCF. The advantage in this approach is that it utilizes the capability of the BGCF to handle E.164 based calls.

Understanding that number portability is going to be an issue only for E.164 numbers, it is advantageous to process all E.164 numbers on one element. According to the IMS model, the BGCF is responsible for routing calls destined for circuit switched networks by delivering the call to the appropriate gateway or another BGCF. According to the present apparatus and method the BGCF not only handles calls made to the circuit switched end-points, but all E.164 based calls including IMS calls that use E.164 numbers. The ENUM query necessary to route the IMS E.164 numbers may be launched from the BGCF. This results in concentrating the logic of handling E.164 numbers on the BGCF and also relieves the S-CSCF of the handling of E.164 logic and digit analysis.

FIG. 1 depicts an embodiment that implements an IMS entity that may support number portability and the routing for all E.164 numbers. This embodiment may be implemented in an IMS network 100 that has a BGCF 108. The BGCF may be operatively coupled to a S-CSCF 106 that is operatively coupled to a P-CSCF 104. The P-CSCF 104 may be operatively coupled to an end point 102.

The BGCF 108 may also be operatively coupled to a NPDB 110 and to an ENUM DB 112. A PDN 114 may be operatively coupled to the BGCF 108, and a PSTN/PLMN 118 may be operatively coupled to the BGCF 108 via a MGCF 116.

Figure 2:
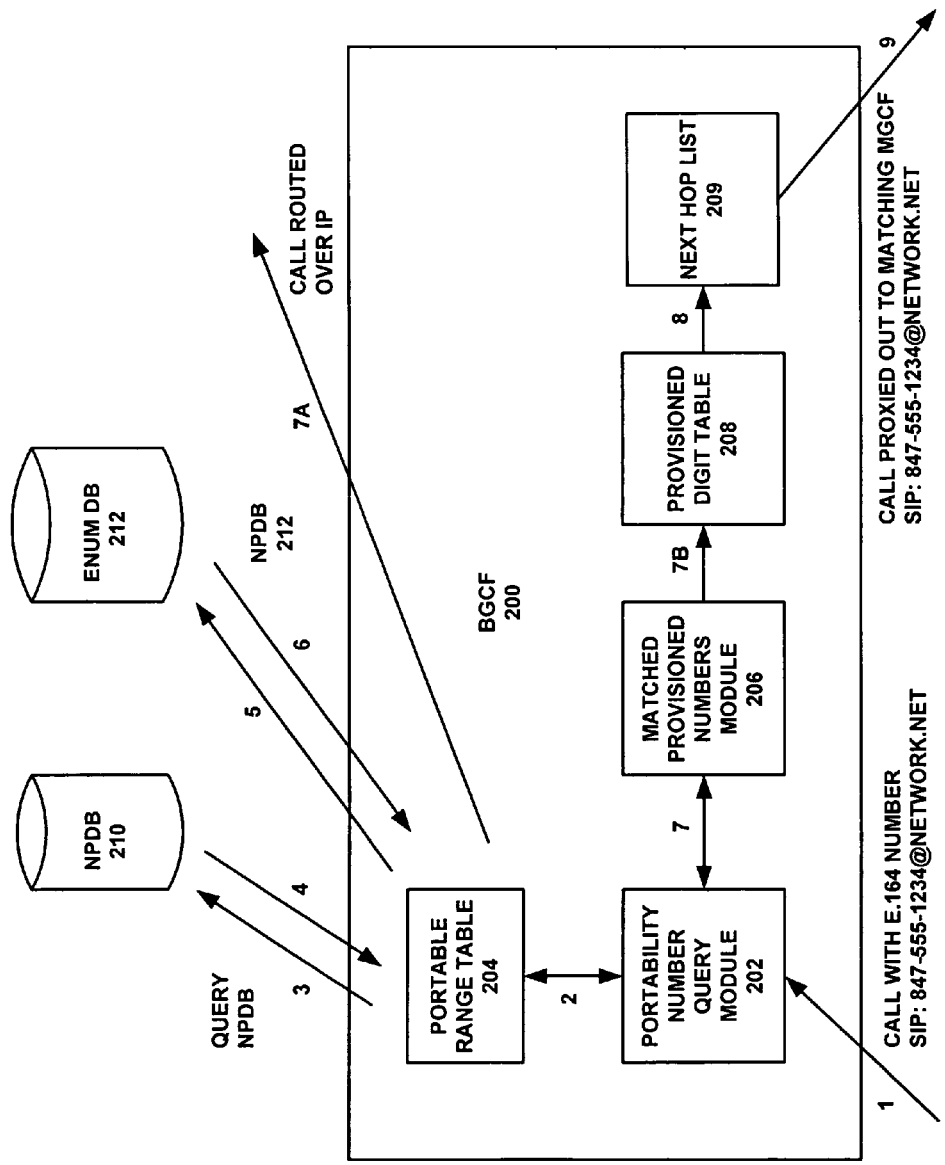
FIG. 2 depicts an embodiment that implements an IMS entity that may support number portability and the routing for all E.164 numbers.

FIG. 2 depicts an embodiment that implements an IMS entity that may support number portability and the routing for all E.164 numbers. This diagram shows the BGCF 200 according to the present apparatus and method with capability to query NPDB 210 and ENUM DB 212. One example of the operation of this embodiment is as follows:

1. Call with E.164 number comes in to a portability number query module 202 in the BGCF 200 from an S-CSCF (not depicted). The S-CSCF sends all E.164 calls to BGCF 200.

2. In the portability number query module 202 that may be operatively coupled to a portable range table 204, the call is checked for various parameters and the digits are checked to see if they fall in a portable block of numbers.

3/4. The NPDB 210 is queried to determine if the number is ported and if so to get the routing number.

5/6. The ENUM DB 212 is then queried (with original E.164 number or routing number if ported) to check if it can be sent over IP.

7. The portability number query module 202 may be operatively coupled to a matched provisioned numbers module 206.

7A. The call may be routed over IP with results from the ENUM DB 212.

7B. If no URI is returned from the ENUM query, the call may be routed to the MGCF based on the provisioned digit table 208.

8/9. This is same as existing BGCF for routing to MGCF via a next hop list 209.

Figure 3:
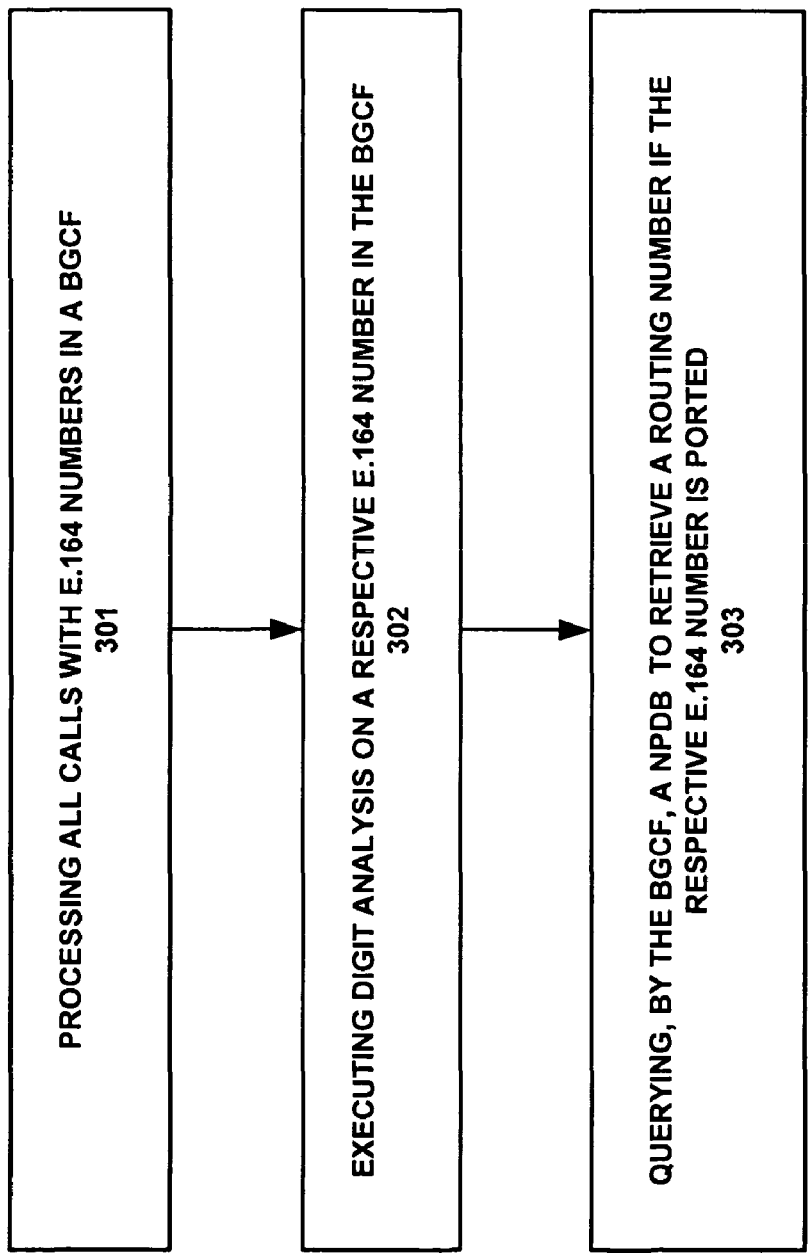
FIG. 3 is a general flow diagram of one embodiment according to the present method.

FIG. 3 is a general flow diagram of one embodiment according to the present method. This embodiment may have the steps of: processing all calls with E.164 numbers in a BGCF (step 301); executing digit analysis on a respective E.164 number in the BGCF (302); and querying, by the BGCF, a NPDB to retrieve a routing number if the respective E.164 number is ported (303).

Figure 4:
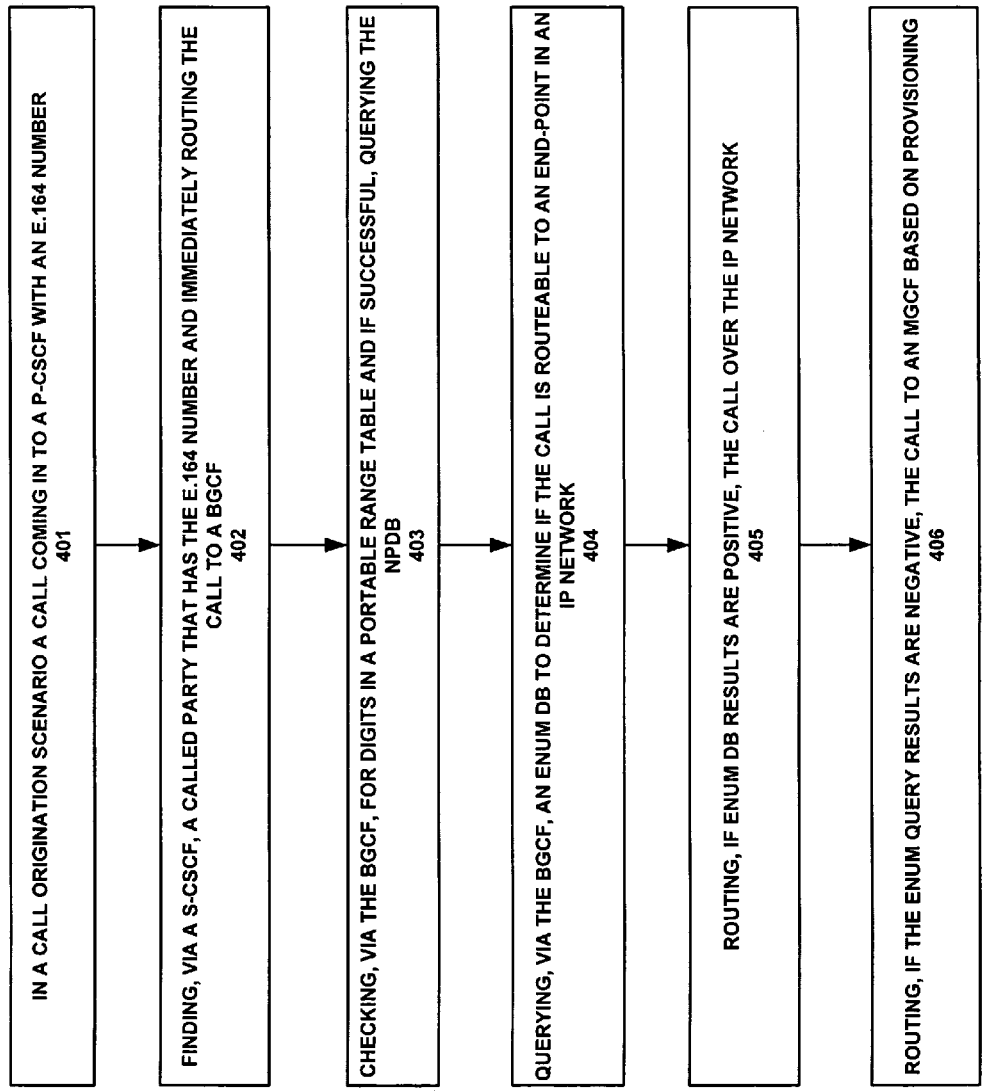
FIG. 4 is a general flow diagram of one embodiment according to the present method for an origination call flow (call going out of the switch)

FIG. 4 is a general flow diagram of one embodiment according to the present method for an origination call flow (call going out of the switch). This embodiment may have the steps of: in a call origination scenario a call coming in to a P-CSCF with an E.164 number (step 401); finding, via a S-CSCF, a called party that has the E.164 number and immediately routing the call to a BGCF (step 402); checking, via the BGCF, for digits in a Portable Range Table and if successful, querying the NPDB (step 403); querying, via the BGCF, an ENUM DB to determine if the call is routeable to an end-point in an IP network (step 404); routing, if ENUM DB results are positive, the call over the IP network (step 405); and routing, if the ENUM query results are negative, the call to an MGCF based on provisioning (step 406).

Figure 5:
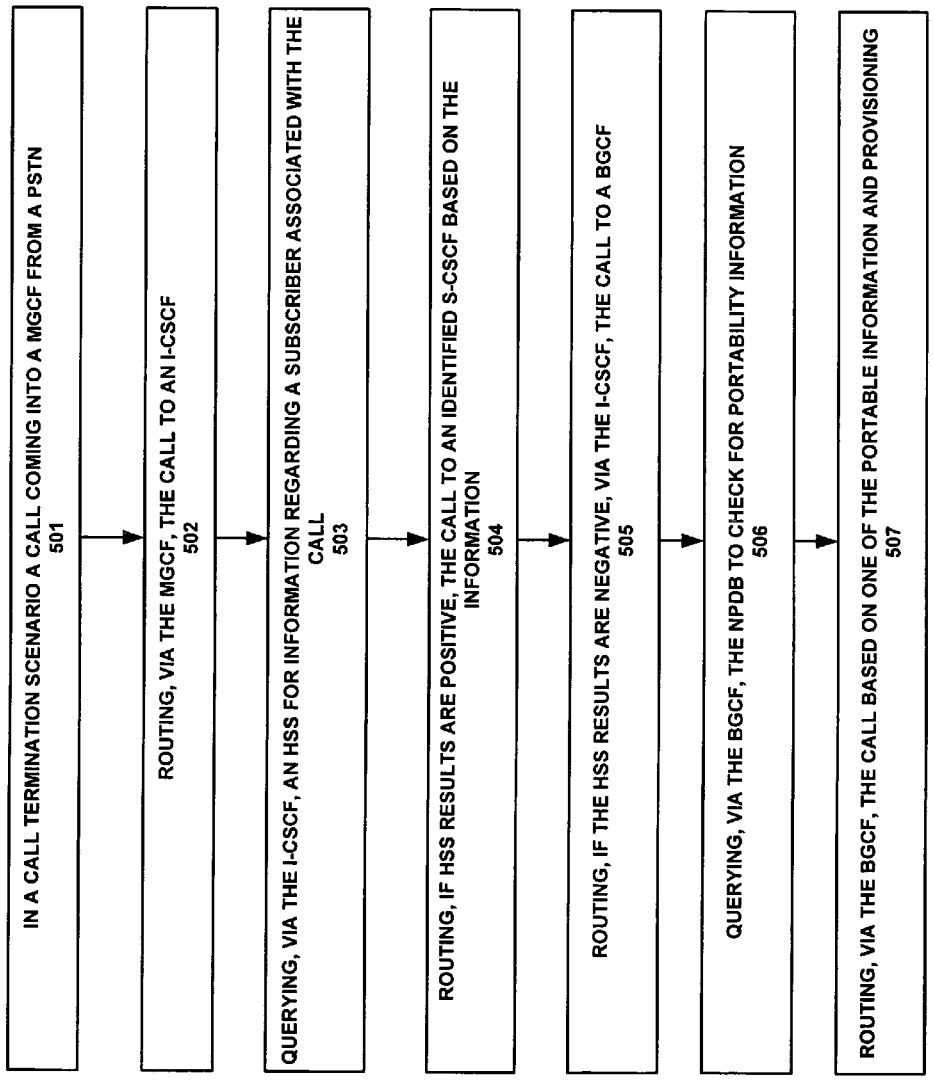
FIG. 5 is a general flow diagram of one embodiment according to the present method for a termination call flow (call coming into the switch)

FIG. 5 is a general flow diagram of one embodiment according to the present method for a termination call flow (call coming into the switch). This embodiment may have the steps of: in a call termination scenario a call coming into a MGCF from a PSTN (step 501); routing, via the MGCF, the call to an I-CSCF (step 502); querying, via the I-CSCF, an HSS for information regarding a subscriber associated with the call (step 503); routing, if HSS results are positive, the call to an identified S-CSCF based on the information (step 504); routing, if the HSS results are negative, via the I-CSCF, the call to a BGCF (step 505); querying, via the BGCF, the NPDB to check for portability information (step 506); and routing, via the BGCF, the call based on one of the portable information and provisioning (step 507).

Figure 6:
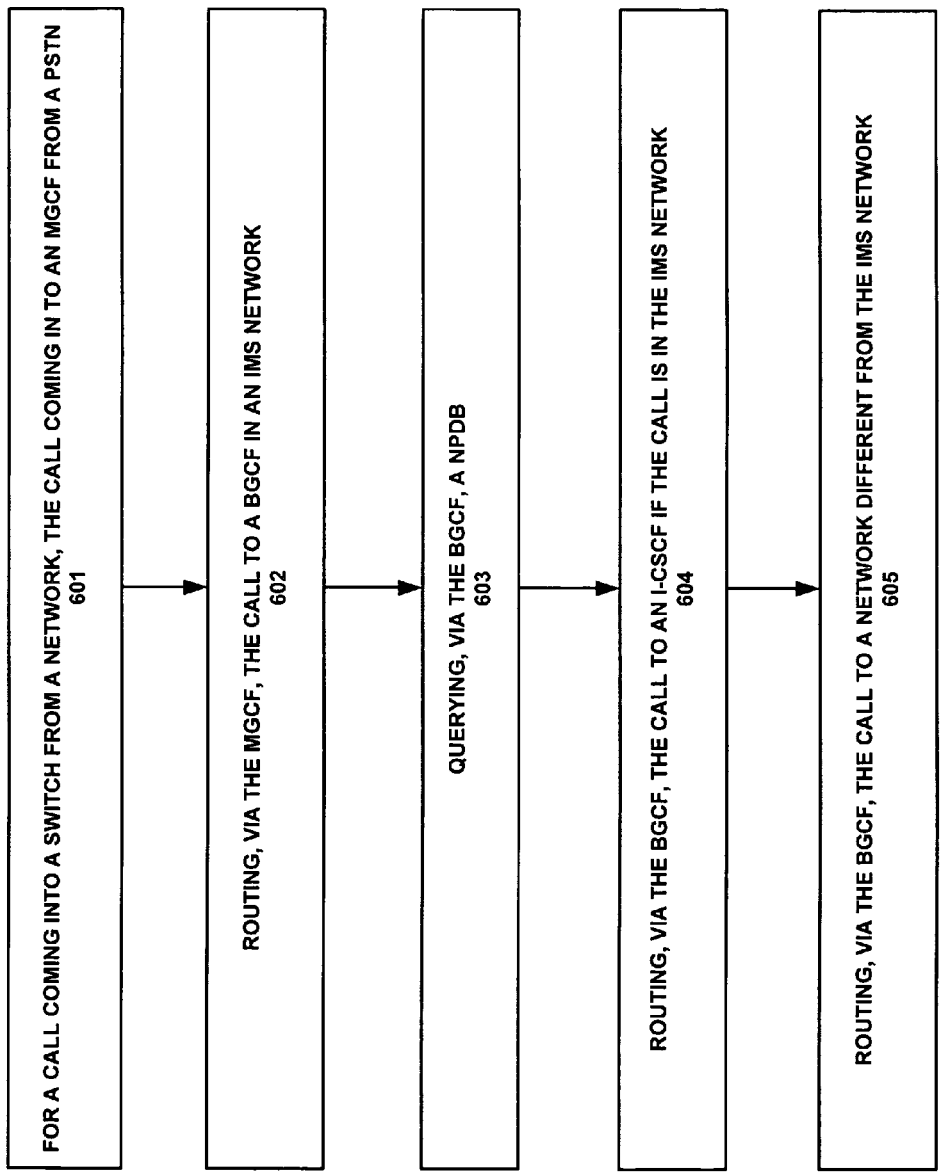
FIG. 6 is a general flow diagram of one embodiment according to the present method for an alternate termination call flow (call coming into the switch)

FIG. 6 is a general flow diagram of one embodiment according to the present method for an alternate termination call flow (call coming into the switch). This embodiment may have the steps of: for a call coming into a switch from a network, the call coming in to an MGCF from a PSTN (step 601); routing, via the MGCF, the call to a BGCF in an IMS network (step 602); querying, via the BGCF, a NPDB (step 603); routing, via the BGCF, the call to an I-CSCF if the call is in the IMS network (step 604); and routing, via the BGCF, the call to a network different from the IMS network (step 605).

Figure 7:
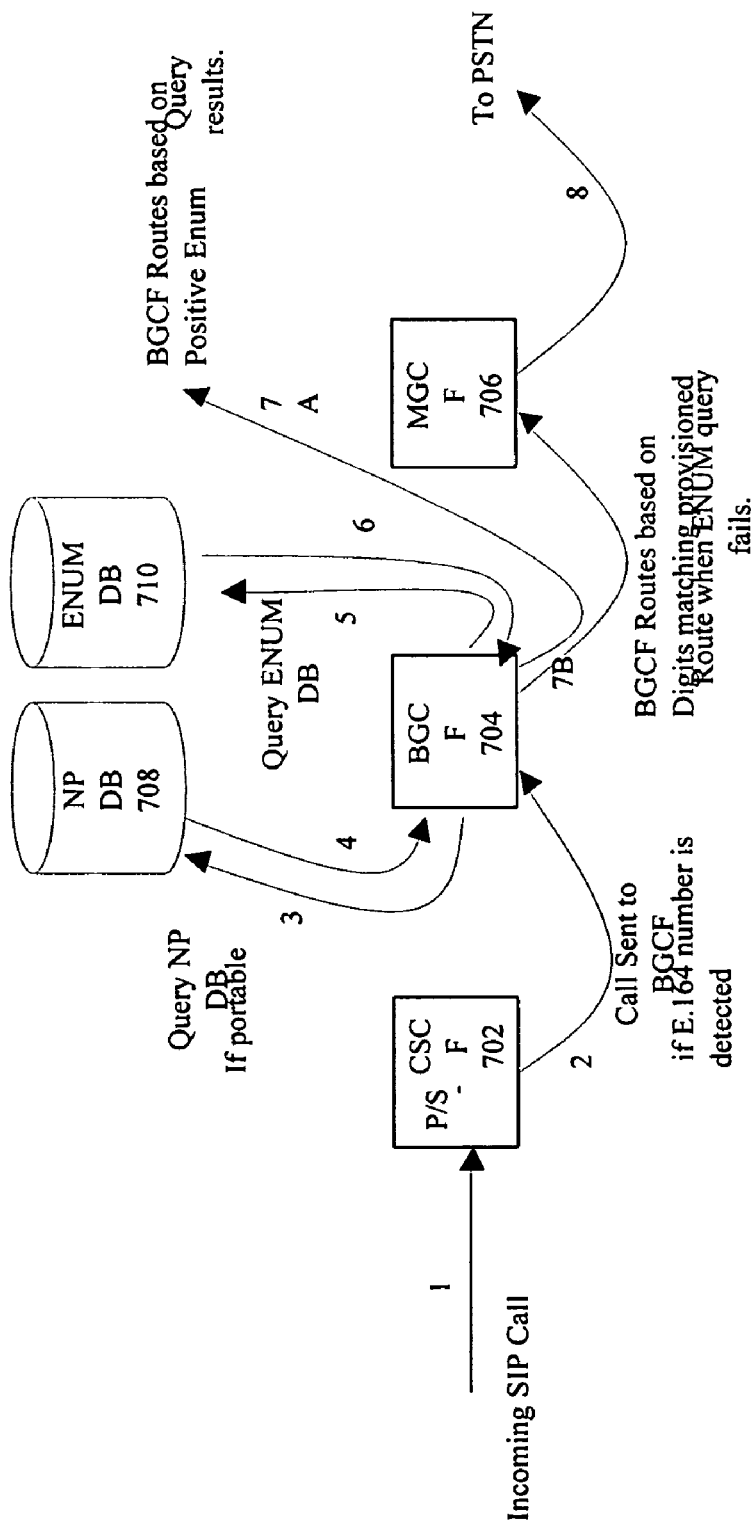
FIG. 7 graphically depicts another embodiment according to the present method for an origination call flow.

FIG. 7 graphically depicts another embodiment according to the present method for an origination call flow. In this embodiment the call flow occurs as follows:

1. Call comes in to the P-CSCF (P/S-CSCF 702) with E.164 number from a SIP phone.
2. The S-CSCF (P/S-CSCF 702) finds the called party to have E.164 number and immediately routes the call to BGCF 704.
3/4. BGCF 704 checks for digits in the new portable database and if successful, queries the NPDB 708.
5/6. BGCF 704 queries the ENUM DB 710 to see if call can be routed to IP end-point.
7A. On successful ENUM DB results, the call is routed over IP.
7B. If the ENUM query results are negative, the call is routed to MGCF 706 based on provisioning.

Figure 8:
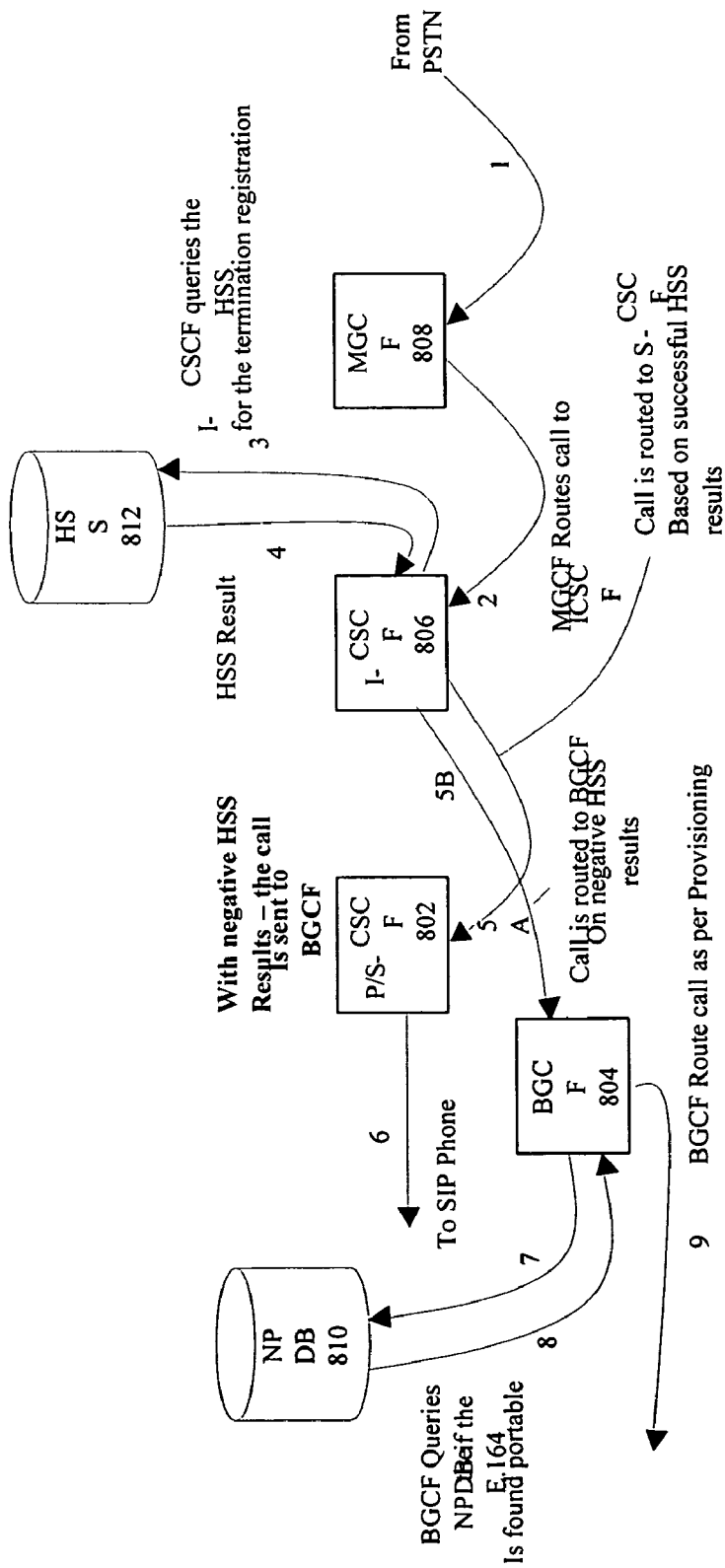
FIG. 8 graphically depicts another embodiment according to the present method for a termination call flow.

FIG. 8 graphically depicts another embodiment according to the present method for a termination call flow. In this embodiment the call flow occurs as follows:

1. Call comes into MGCF 808 from PSTN.
2. MGCF 808 routes the call to I-CSCF 806.
3/4. I-CSCF 806 queries the HSS 812 for information on subscriber.
5A. On successful results from HSS 812 the call is routed to the identified S-CSCF (P/S-CSCF 802).
5B. On unsuccessful HSS 812 results, the I-CSCF 806 routes the call to BGCF 804.
7/8. BGCF 804 queries the NPDB 810 to check portability.
9. BGCF 804 routes the call based on new portable information or provisioning.

Figure 9:
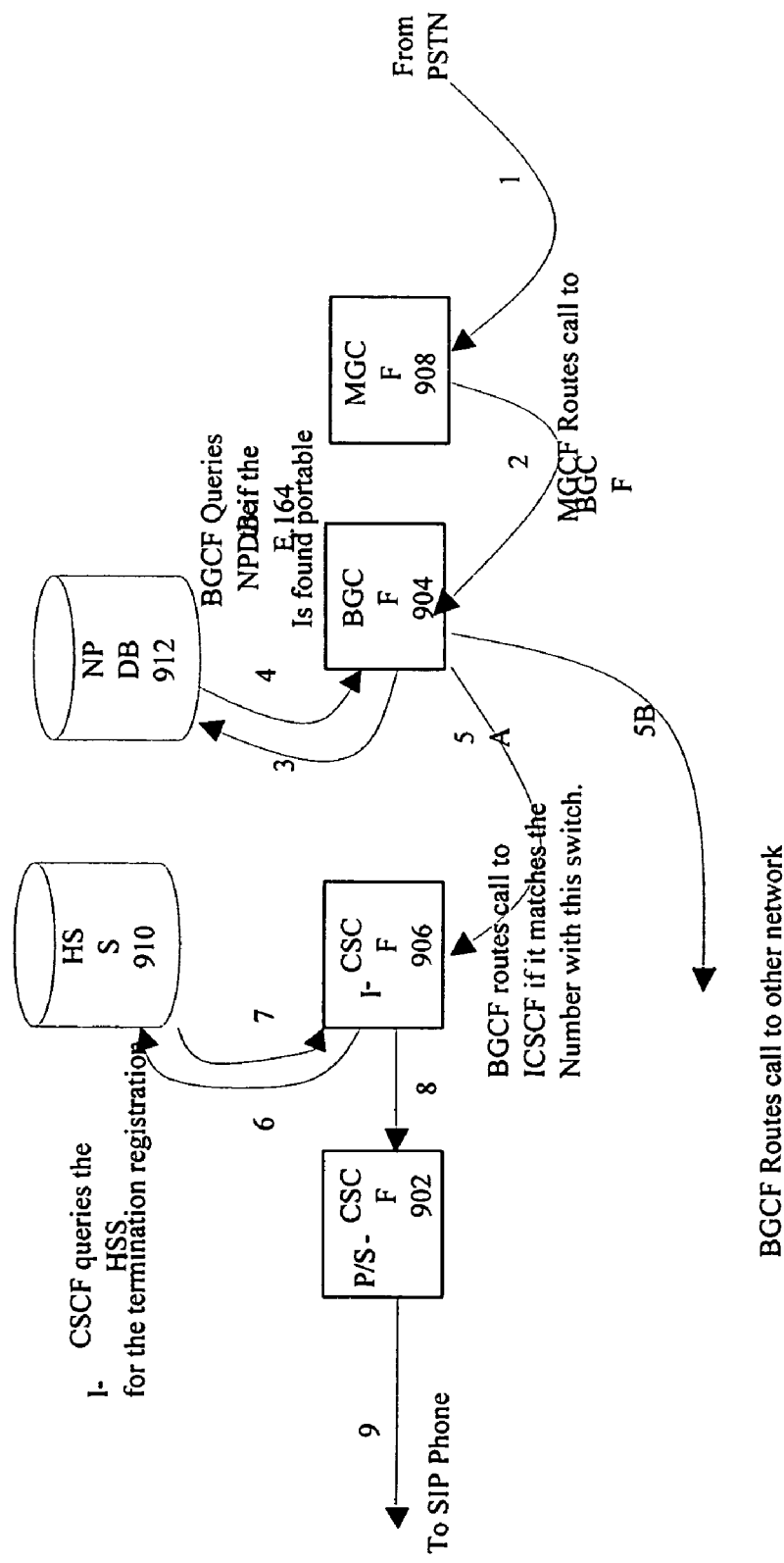
FIG. 9 graphically depicts an alternate embodiment according to the present method for a termination call flow.

FIG. 9 graphically depicts an alternate embodiment according to the present method for a termination call flow. In this embodiment the call flow occurs as follows:

1. Call comes in to MGCF 908 from PSTN.
2. MGCF 908 routes the call to BGCF 904.
3/4. BGCF 904 queries the NPDB 912.
5A. BGCF 904 routes call to I-CSCF 906 if call in the same network.
5B. BGCF 904 routes call out to a different network if call not in the same network.
6/7. I-CSCF 906 queries the HSS 910 for information on subscriber.

On successful results from HSS 910 the call is routed to the identified S-CSCF (P/S-CSCF 902).

9. The I-CSCF 906 routes the call to a SIP phone.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a BGCF (Breakout Gateway Control Function) in an IMS (IP Multimedia Subsystem) network;
a portability number query module in the BGCF;
a portable range table operatively coupled to the portability number query module;
a NPDB (Number Portability Database) operatively coupled to the portability number query module in the BGCF; and
an ENUM DB (ENUM Database) operatively coupled to the portability number query module in the BGCF, wherein the BGCF processes all E.164 based calls of the apparatus, including IMS calls having E.164 numbers, by launching a query to the NPDB to retrieve a routing number of a call, checking digits of the call with the portability number query module, determining via NPDB if the E.164 number of the call is ported, obtaining a routing number if the E.164 number is routed, and checking via ENUM if the call can be routed over IP.

2. The apparatus according to claim 1, wherein the apparatus further comprises:
match provisioned numbers module operatively coupled to the portability number query module in the BGCF; and
a next hop list operatively coupled to the match provisioned numbers module, wherein the call is proxied out to a matching MGCF based on provisioning.)

3. The apparatus according to claim 1, wherein the portability number query module in the BGCF has an input on which it received calls with E.164 numbers.

4. A system, comprising:
an IMS (IP Multimedia Subsystem) network having a P-CSCF (Proxy Call Session Control Function), the P-CSCF having an input for receiving an E.164 number;
a S-CSCF (Serving Call Session Control Function) operatively coupled to the P-CSCF;
a BGCF (Breakout Gateway Control Function) in an IMS (IP Multimedia Subsystem) network;
a portability number query module in the BGCF;
a portable range table operatively coupled to the portability number query module;
a NPDB (Number Portability Database) operatively coupled to the portability number query module in the BGCF;
an ENUM DB (EN1JM Database) operatively coupled to the portability number query module in the BGCF;
a MGCF (Media Gateway Control Function) operatively coupled to the BGCF, wherein number portability is handled by the system using BGCF for all E.164 calls, including IMS calls;
wherein match provisioned numbers module operatively coupled to the portability number query module in the BGCF; and
a next hop list operatively coupled to the match provisioned numbers module, wherein the E.164 calls that are portable are routed over an IP network, and the E.164 calls that are not portable are proxied to a matching MGCF.

5. The system according to claim 4, wherein portability number query module in the BGCF has an input on which it received calls with E.164 numbers.

6. The system according to claim 4, wherein a PDN (Packet Data Network) is operatively coupled to the BGCF, and wherein a routing number of one of the E.164 calls having a VOIP endpoint is routed to the IP network after an ENUM query.

7. The system according to claim 4, wherein a PSTN (Public Switched Telephone Network)/PLMN (Public Land Mobile Network) is operatively coupled to the MGCF and wherein a routing number of one of the E.164 calls having the PSTN/PLMN as an endpoint is routed to the PSTN/PLMN.

8. The system according to claim 4, wherein an I-CSCF (Interrogating Call Session Control Function) is operatively coupled to the BGCF, and wherein an HSS (Home Subscriber Server) is operatively coupled to the I-CSCF, such that the system can query the HSS for information regarding a subscriber via the I-CSFS.

9. A method, comprising:
in a call origination scenario a call coming in to a P-CSCF (Proxy Call Session Control Function) with an E.164 number;
finding, via a S-CSCF (Serving Call Session Control Function), a called party that has the E.164 number and immediately routing the call to a BGCF (Breakout Gateway Control Function);
checking, via the BGCF, for digits in a Portable Range Table and if successful, querying an NPDB;
querying, via the BGCF, an ENUM DB (TElephone NUmber Mapping Database) to determine if the call is routeable to an end-point in an IP network;
routing, if the ENUM DB results is positive, the call over the IP network; and
routing, if the ENUM query result is negative, the call to an MGCF(Media Gateway Control Function) based on provisioning.

10. The method according to claim 9,wherein the incoming call with the E.164 number is from a SIP (Session Initiation Protocol) phone.

11. The method according to claim 9, wherein the BGCF is in an IMS (IP Multimedia Subsystem) network.

12. A method, comprising:
in a call termination scenario a call coming into a MGCF (Media Gateway Control Function) from a PSTN (Public Switched Telephone Network);
routing, via the MGCF, the call to an I-CSCF (Interrogating Call Session Control Function);
querying, via the I-CSCF, an HSS (Home Subscriber Server) for information regarding a subscriber associated with the call;
routing, if the HSS results is positive, the call to an identified S-CSCF (Serving Call Session Control Function) based on the information;
routing, if the HSS query result is negative, via the I-CSCF, the call to a BGCF (Breakout Gateway Control Function);
querying, via the BGCF, an NPDB (portable number database) to check for portability information; and
routing, via the BGCF, the call based on one of the portability information and provisioning.

13. The method according to claim 12, wherein the BGCF is in an IMS (IP Multimedia Subsystem) network 14. A method, comprising: for a call coming into a switch from a network, the call coming into an MGCF (Media Gateway Control Function) from a PSTN (Public Switched Telephone Network);
routing, via the MGCF, the call to a BGCF (Breakout Gateway Control Function) in an IMS Multimedia Subsystem) network;
querying, via the BGCF, a NPDB (portable number database);
routing, via the BGCF, the call to an I-CSCF (interrogating Call Session Control Function) if the call is in the IMS network based on a result of the NPDB query; and
if the call is not in the IMS network based on a result of the NPDB query, routing, via the BGCF, the call to a network different from the IMS network.

15. The method according to claim 14, wherein the method further. comprises:
querying, via the BGCF, the NPDB to check for portability information; and
routing, via the BGCF, the call based on one of the portable information and provisioning.

16. A method, comprising:
processing calls with E.164 numbers in a BGCF (Breakout Gateway Control Function);
executing digit analysis on one of the calls in the BGCF;
querying, by the BGCF, a NPDB (portable number database) to retrieve a routing number if the respective E.164 number is ported; and
wherein the method further comprises routing, via the BGCF, the call to an IP network after making an ENUM (TElephone NUmber Mapping) query, if the routing number is for a VoIP (Voice over IP) endpoint wherein the BCGF processes all E.164 based calls including IMS (IP Multimedia Subsystem) calls having E.164 numbers.

17. The method according to claim 16, wherein the method further comprises routing, via the BGCF, the call to an MGCF (Media Gateway Control Function), if the routing number is for a PSTN (Public Switched Telephone Network)/PLMN (Public Land Mobile Network).

18. The method according to claim 17, wherein the BGCF is in an IMS (IP Multimedia Subsystem) network.

* * * * *